July 21, 1959  H. A. DVORAK  2,895,683
DEVICE FOR SPRAYING FLUIDS
Filed Sept. 30, 1957
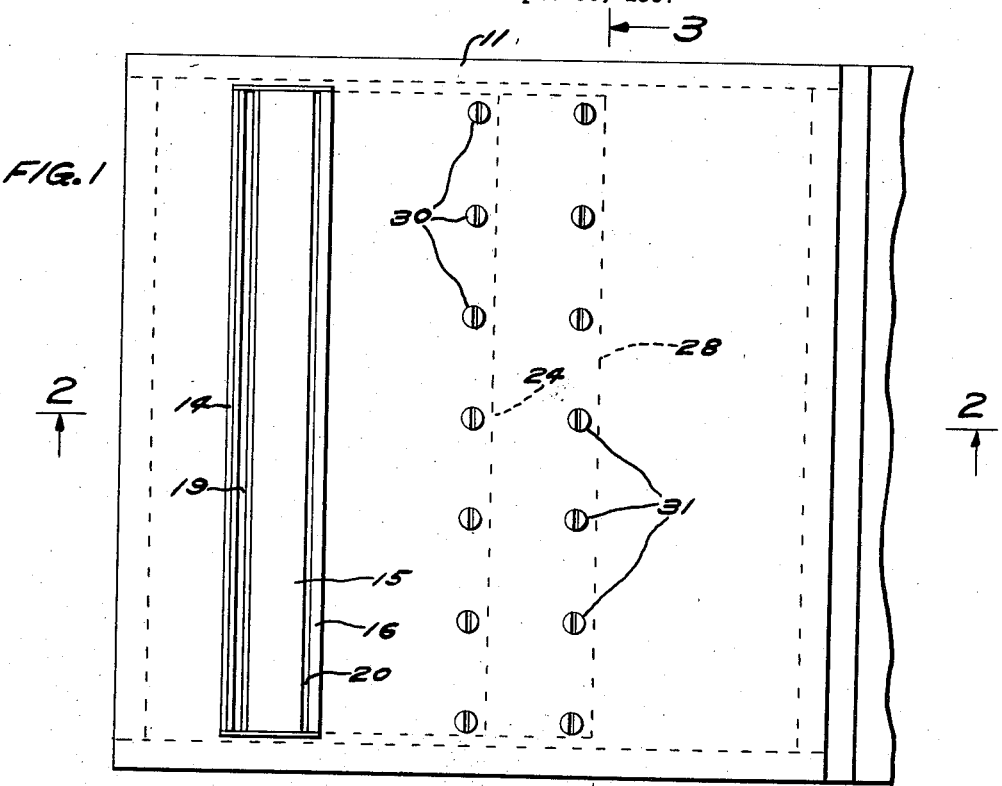
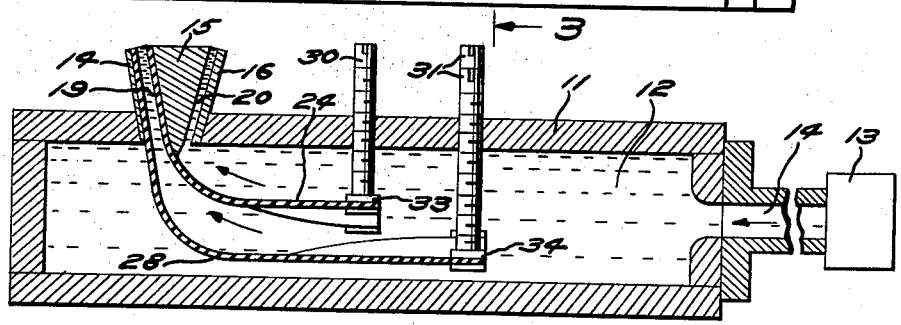
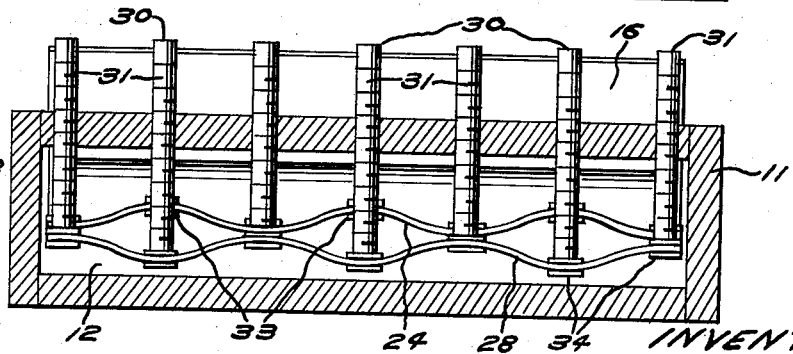
INVENTOR
H. A. DVORAK
BY C. S. Hamilton
ATTORNEY

United States Patent Office 2,895,683
Patented July 21, 1959

2,895,683

DEVICE FOR SPRAYING FLUIDS

Howard A. Dvorak, Brookfield, Ill., assignor to Western Electric Company, Incorporated, New York, N.Y., a corporation of New York Application September 30, 1957, Serial No. 687,036

7 Claims. (Cl. 239—332)

This invention relates to devices for forming fluid fountains and more particularly to devices for providing elongated fountains of molten solder of predetermined height configurations.

In the soldering of certain articles, such as certain types of printed wiring boards, it is desirable to provide an elongated sheet-like fountain of molten solder having various heights along its length. It is further desirable to provide a sheet-like solder fountain which may be adjusted in height along its length and over which an article to be soldered may be passed.

An object of this invention is to provide a device for forming an elongated fountain of fluid having varying heights along its length.

Another object of this invention is to provide a device having an elongated nozzle for forming an elongated fountain of solder having predetermined various adjustable heights along its length.

A further object of this invention is to provide a device having an elongated nozzle and a flexible vane for forming a solder fountain of adjustable height.

A still further object of this invention is to provide a device having an elongated nozzle for forming an elongated fountain of fluid and an adjustable member for varying the height of the fluid fountain to predetermined values along its length.

With these and other objects in mind, the present invention contemplates a closed chamber into which solder is forced under pressure and from which solder exits through a pair of elongated nozzles. A pair of flexible vanes for directing solder to the pair of nozzles extend into the flow path or stream of solder entering the container. A plurality of set screws secured to each flexible vane extends through the wall of the container to provide an adjustment of the height of the solder fountain along the length of each nozzle by adjusting the positions of the flexible vanes.

Other objects and advantages of the invention will become apparent by reference to the following detailed description and the accompanying drawing illustrating a preferred embodiment of the invention, in which Fig. 1 is a plan view of a device embodying the principles of the invention;

Fig. 2 is a cross-sectional view taken on line 2—2 of Fig. 1 showing flexible vanes which are adjusted to control the height of the solder fountain; and Fig. 3 is a sectional view taken on line 3—3 of Fig. 1 showing the manner in which the flexible vanes may be adjusted.

Referring now in detail to the drawing, there is shown a container 11 forming a chamber 12 into which molten solder is forced under pressure by a pump 13 through an elongated opening 17. A plurality of elements 14, 15, 16 secured to and extending across the container 11 constitute nozzles having discharge openings 19 and 20 through which solder leaves the chamber 12 in sheet-like fountains.

A trailing edge of a first vane or proportioning partition 24 of a flexible material is secured to the element 15 and extends into the chamber 12 and toward the opening 17 for controlling the flow of molten solder to and through the discharge opening 20. A trailing edge of a second vane or proportioning partition 28 of a flexible material is secured to the element 14 and extends beneath the first vane 24 and toward the opening 17 for controlling the flow of solder to and through the discharge opening 19.

Set screws 30 and 31 threaded through the upper wall of the container 11 and secured to bushings 33 and 34 on the leading edges of the vanes 24 and 28 are provided for varying the configurations or positions of the leading edges of the vanes 24 and 28 to vary the heights of the solder fountain along the width of the discharge openings 19 and 20.

In operation of the device, the set screws 30 and 31 are first adjusted to bend the leading edges of the vanes or partitions 24 and 28 to adjust or control the flow of solder through the discharge openings 19 and 20. The flow of solder through a given point in the opening 20 is dependent upon the distance from the leading edge of the vane 24 at that point. The flow of solder through the opening 20 at any given point is dependent upon the distance between the leading edges of the vanes 24 and 28 at that point.

After the vanes 24 and 28 have been bent into the proper configurations to produce fountains of desired configurations, the pump 13 is actuated and the soldering operations may begin.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for forming a fluid fountain, comprising a container for receiving a stream of fluid and having an elongated opening for discharging the fluid in a sheet-like fountain, a member movably positioned in and extending across the container for regulating the flow of fluid through the opening, said member having a leading edge extending into the stream of fluid and having a trailing edge secured to the container adjacent to said opening, and means mounted on the container and secured to said leading edge for adjusting the position of the leading edge of the movable member.

2. A device for forming a fluid fountain, comprising a container for receiving a stream of fluid and having an elongated opening for discharging the fluid in a sheet-like fountain, a flexible member positioned in and extending across the container for regulating the flow of fluid through the opening, said member having a leading edge extending into the stream of fluid and a trailing edge secured to the container adjacent to the elongated opening, and means attached to the container for bending the leading edges of the flexible member into various configurations for adjusting the flow of fluid through the opening.

3. A device for forming a fountain of fluid, comprising a container for receiving a stream of fluid, an elongated nozzle on the container for discharging fluid in an elongated fountain, a flexible vane mounted in and extending across the container for regulating the flow of fluid from the nozzle, said vane having a leading edge extending into the stream of fluid and a trailing edge secured to the container adjacent to the nozzle, and means attached to the container for bending the leading edge of the flexible vane for adjusting said flow.

4. A device for forming a fluid fountain, comprising a closed container for receiving a stream of fluid, an elongated nozzle on the container for discharging fluid from the container in an elongated sheet-like fountain, a flexible member mounted in the container and extending thereacross and having a leading edge extending into said stream of fluid for controlling the flow of fluid from the nozzle, and a plurality of elements threaded through the container and connected to the leading edge of the member at spaced intervals for varying the configuration thereof to control said flow.

5. A device for forming sheet-like fluid fountains, comprising a closed container for receiving a stream of fluid and having elongated first and second openings for discharging fluid in sheet-like fountains, a first flexible member mounted in the container and extending thereacross for regulating the flow of fluid through the first opening, said first member having a trailing edge secured adjacent to the first opening and a leading edge extending into the stream of fluid, means secured to the container for varying the configuration of the leading edge of the first member from its normal configuration for regulating said flow through the first opening, a second flexible member mounted in the container and extending thereacross for regulating the flow of fluid through the second opening, said second member having a trailing edge secured to the container adjacent to the second opening and a leading edge extending into said stream of fluid, and means secured to the container for varying the configuration of the leading edge of the second member to adjust the flow of fluid through the second opening.

6. A device for forming a plurality of sheet-like fluid fountains, comprising a closed container for receiving a stream of fluid and having a plurality of elongated openings for discharging fluid in a plurality of sheet-like fountains, a plurality of spaced flexible members secured to the container adjacent to the openings and having normally straight leading edges positioned in the stream of fluid, and means attached to the container and engaging said leading edges for varying the configurations of the leading edges of the members to adjust the rates of flow of fluid through the elongated openings along the length of said openings.

7. A device for forming a sheetlike fountain of molten solder of variable height, comprising a closed container of rectangular cross section for receiving a stream of fluid, said container having an elongated opening extending across one side thereof normal to the stream of fluid, a flexible vane having a trailing edge secured to the container at the downstream side of the elongated opening and having a leading edge extending into the stream of fluid, and a plurality of set screws threaded through said one side of the container and attached to the leading edge of the vane for varying the configuration of said leading edge to regulate the flow of solder through the elongated opening.

References Cited in the file of this patent

UNITED STATES PATENTS

| | | |
|---|---|---|
| 469,211 | Kline | Feb. 16, 1892 |
| 1,072,951 | Johnston | Sept. 9, 1913 |
| 2,472,949 | Jackson | June 14, 1949 |

FOREIGN PATENTS

| | | |
|---|---|---|
| 254,715 | Switzerland | Dec. 16, 1948 |